United States Patent
Henry

(10) Patent No.: US 7,460,722 B2
(45) Date of Patent: Dec. 2, 2008

(54) ENCODING OF DIGITAL DATA WITH DETERMINATION OF SAMPLE PATH

(75) Inventor: Félix Henry, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 881 days.

(21) Appl. No.: 10/340,796

(22) Filed: Jan. 13, 2003

(65) Prior Publication Data
US 2003/0154173 A1    Aug. 14, 2003

(30) Foreign Application Priority Data
Jan. 11, 2002   (FR)   ................... 02 00330
Jan. 11, 2002   (FR)   ................... 02 00332

(51) Int. Cl.
*G06K 9/36*   (2006.01)
*G06K 9/46*   (2006.01)

(52) U.S. Cl. .................. 382/239; 382/246; 382/100; 382/224; 382/168; 382/199

(58) Field of Classification Search ............... 382/173, 382/100, 103, 224, 195, 199, 168, 181; 348/143, 348/590, 150; 345/419, 158; 340/541; 715/863
See application file for complete search history.

(56) References Cited

U.S. PATENT DOCUMENTS

| | | | | |
|---|---|---|---|---|
| 4,013,828 | A * | 3/1977 | Judice ................... | 375/240.22 |
| 5,072,379 | A * | 12/1991 | Eberhardt ................... | 705/7 |
| 5,136,374 | A * | 8/1992 | Jayant et al. ............ | 375/240.11 |
| 5,357,250 | A | 10/1994 | Healey et al. ................ | 341/107 |
| 5,481,308 | A * | 1/1996 | Hartung et al. ........ | 375/240.11 |
| 5,721,822 | A | 2/1998 | Agarwal ................. | 395/200.18 |
| 5,748,786 | A | 5/1998 | Zandi et al. .................. | 382/240 |
| 5,778,192 | A * | 7/1998 | Schuster et al. ............. | 709/247 |
| 5,818,536 | A * | 10/1998 | Morris et al. .......... | 375/240.15 |
| 5,878,387 | A * | 3/1999 | Oshikiri et al. ............. | 704/207 |
| 5,907,360 | A | 5/1999 | Kessler et al. ................ | 348/398 |
| 5,978,517 | A | 11/1999 | Henry et al. ................. | 382/253 |
| 5,995,027 | A | 11/1999 | Henry .......................... | 341/50 |
| 6,192,081 | B1 * | 2/2001 | Chiang et al. .......... | 375/240.16 |
| 6,215,422 | B1 | 4/2001 | Henry et al. ................... | 341/51 |

(Continued)

FOREIGN PATENT DOCUMENTS

EP   0 940 994 A2   9/1999

(Continued)

OTHER PUBLICATIONS

Gersho et al., "Vector Quantization and Signal Compression", chapter 9, section 4, Ed. Kluwar Academic Press, 1992.

(Continued)

*Primary Examiner*—Ali Bayat
(74) *Attorney, Agent, or Firm*—Fitzpatrick, Cella, Harper & Scinto

(57) ABSTRACT

A method of encoding digital samples of a set of data representing physical quantities, the encoding including the determination of a path among the samples of the set. The method includes measuring an encoding cost which depends on the path, and modifying the path, the steps of measuring and modifying being reiterated so as to determine a path which minimizes the encoding cost.

21 Claims, 8 Drawing Sheets

U.S. PATENT DOCUMENTS

| | | | |
|---|---|---|---|
| 6,333,705 B1 | 12/2001 | Amonou et al. | 341/107 |
| 6,336,212 B1 * | 1/2002 | Gray et al. | 717/124 |
| 6,498,866 B2 | 12/2002 | Charrier et al. | 382/248 |
| 6,501,860 B1 | 12/2002 | Charrier et al. | 382/240 |
| 6,508,596 B1 * | 1/2003 | Matsumi et al. | 360/8 |
| 6,631,213 B1 | 10/2003 | Amonou et al. | 382/232 |
| 6,909,746 B2 * | 6/2005 | Trovato | 375/240.03 |
| 2002/0015530 A1 | 2/2002 | Henry et al. | 382/233 |
| 2002/0054644 A1 | 5/2002 | Henry et al. | 375/240.27 |
| 2002/0126698 A1 * | 9/2002 | Deshpande | 370/467 |
| 2003/0147561 A1 * | 8/2003 | Faibish et al. | 382/245 |
| 2005/0207663 A1 * | 9/2005 | Zeng et al. | 382/236 |

FOREIGN PATENT DOCUMENTS

| | | |
|---|---|---|
| EP | 1263236 A2 | 12/2002 |
| GB | 2 325 584 A | 11/1998 |
| GB | 2365531 A | 2/2002 |

OTHER PUBLICATIONS

David Akopian, et al., "An Optimized Multiscanning Approach For Still Image Compression," Multimedia Signal Processing, 1999 IEEE 3$^{rd}$ Workshop On Compenhagen, Denmark, Sep. 13-15, 1999, Piscataway, NJ, pp. 401-406.

Jaehan In, et al., "JPEG Compliant Efficient Progressive Image Coding," Acoustics, Speech and Signal Processing, 1998. Proceedings of the 1998 IEEE Seattle International Conference on Seattle, WA, May 12-15, 1998, New York, NY, pp. 2633-2636.

Jun Seok Song, et al., "Display-dependent Dynamic Bit-streaming of Wavelet Compressed Data For Image Retrieval Systems," Electronics Letters, IEE Stevenage, GB, vol. 34, No. 1, Jan. 8, 1998, pp. 58-59.

Paul G. Howard, et al., "Arithmetic Coding For Data Compression," Proceedings of the IEEE, IEEE, New York, vol. 82, No. 6, Jun. 1, 1994, pp. 857-865.

D. Salomon, "Data Compression: The Complete Reference," New York, NY, Springer, 1998, pp. 85-100, 403-417.

Glen G. Langdon, Jr., et al., "Compression of Black-White Images with Arithmetic Coding," IEEE Transactions on Communications Systems, New York, NY vol. 29, No. 6, 1981, pp. 858-867.

* cited by examiner

ENCODING OF DIGITAL DATA WITH DETERMINATION OF SAMPLE PATH

BACKGROUND OF THE INVENTION

1. Field of the Invention

The present invention generally relates to digital signal encoding and for this purpose provides a method and a device for encoding a digital signal.

The object of the encoding is to compress the signal, which makes it possible to transmit the digital signal and to store it in memory while reducing the transmission time, or the transmission rate, respectively by reducing the space in memory that is used.

The invention is in the field of lossy compression of digital signals. The digital signals considered here are of any type, for example fixed images, video, sound, or computer data.

In what follows, the encoding and decoding of a fixed image will more particularly be considered.

2. Description of the Related Art

In this context, certain encoding modes use a path established between a set of digital samples. For example, the French patent applications No. 01 06933 and 01 13922 concern such encoding modes.

For the encoding to be efficient, that is to say for it to have a good rate-distortion ratio, it is necessary to determine the path in an appropriate manner.

Techniques exist to determine a path between a set of samples. These techniques are known as techniques for solving the traveling salesman problem. A review of these techniques is for example set out in the work of Gerhard Reinelt entitled "The traveling salesman, computational solutions for TSP applications", Springer-Verlag, 1994.

SUMMARY OF THE INVENTION

However, the inventor has observed that these techniques do not give a good result if they are directly applied to the problem of the encoding of data. This is because the distance between two points of the path is expressed here by an encoding cost which depends in particular on the rate associated with a vector linking the two points. However, this rate depends in turn on the vectors already chosen in the path since it is they which determine the statistic from which the rate of each vector is calculated.

Consequently, the insertion of the point in the path modifies all the distances between points.

The first object of the present invention is to remedy the drawbacks of the prior art, by providing a method and device for encoding digital samples which includes the determination of a path between the samples of the set, which makes it possible to obtain a good rate-distortion ratio.

The determination of the path is carried out from statistical data calculated from the data to be encoded. More particularly, the path depends on the occurrence count of each sample, or more exactly of vectors associated with the samples.

Other types of encoding are also carried out on the basis of statistical data. For example, the document U.S. Pat No. 5,907,360 concerns image sequence encoding. Movement vectors representing respectively the displacement of blocks of pixels between two consecutive images of the sequence are thus encoded.

The inventor has found that it is possible to improve the efficiency of these encoding modes by modifying the statistical data used for the encoding.

The second object of the present invention is thus to provide an encoding method and a device which improve the rate-distortion ratio by modifying the statistical data used for the encoding in an appropriate manner.

In a first aspect, the invention provides a method of encoding digital samples of a set of data representing physical quantities, the encoding including the determination of a path among the samples of the set, characterized in that it comprises the steps of:
measuring an encoding cost which depends on the path,
modifying the path,
the steps of measuring and modifying being reiterated so as to determine a path which minimizes the encoding cost.

In a complementary manner, the invention relates to a device for encoding digital samples of a set of data representing physical quantities, the encoding including the determination of a path between the samples of the set, characterized in that it comprises:
means for measuring an encoding cost which depends on the path,
means for modifying the path,
the means for measuring and modifying being adapted to reiterate their operation so as to determine a path which minimizes the encoding cost.

The invention thus provides an iterative technique for determining a path which minimizes an encoding cost, so offering a good rate-distortion compromise.

According to a preferred feature, the measurement of the encoding cost comprises the calculation of the distortion generated by the encoding of each sample according to the path.

the distortion is simple to calculate. The encoding cost thus takes into account the distortion related to the encoding.

According to a preferred feature, the measurement of the encoding cost comprises the calculation of the rate used to encode each sample according to the path.

The encoding cost thus takes into account the rate necessary to represent the encoded data.

When the above two features are combined, the encoding cost takes into account both the rate and the distortion, which makes, it possible to adjust the path optimally so as to minimize a rate-distortion ratio.

According to a preferred feature, the updating of the rate is carried out every N iterations, with N being an integer greater than or equal to two.

Thus, the calculation times are reduced.

According to preferred features, the modification comprises:
the withdrawal of the last sample from the path,
the adding of a sample not belonging to the path to the end of the path,
the swapping places of two samples of the path.

These modifications make it possible to find an optimum path, during the course of the iterations.

According to a preferred feature, the calculation of the distortion comprises the calculation of the difference between the value of each sample and its respective decoding value.

According to a preferred feature, the calculation of the rate comprises the calculation of the count of occurrences of the vector describing the location of each sample with respect to the preceding sample in the path.

In a second aspect, the invention provides a method of encoding digital samples of a set of data representing physical quantities, the encoding including the determination of elements from the samples of the set, characterized in that it comprises the steps of:
determining the occurrence count of each element, or modifying the nil occurrence counts to make them non-nil, or calculating the rate associated with an element as a function of its occurrence count.

The invention makes it possible to improve the rate-distortion ratio of the encoded data by modifying the statistics used for the encoding.

According to a preferred feature, the modification of the nil occurrence counts comprises adding a non-nil value to all the occurrence counts of the elements. Thus, there is no nil occurrence count and consequently no element is eliminated a priori during encoding.

According to a preferred feature, the steps of determining, modifying and calculating being carried out iteratively, the modification of the nil occurrence counts comprises adding a non-nil value to all the occurrence counts of the elements, this value decreasing progressively with the iterations.

The adjustment of the value which is added to the occurrence counts enables the calculation to be refined.

According to a another preferred feature, the calculation of the rate comprises the determination of the length of code words used to encode the elements. These code words are for example those of a Huffman encoding.

In a complementary manner, the invention relates to a device for encoding digital samples of a set of data representing physical quantities, including means for determining elements from samples of the set, characterized in that it comprises:

means for determining the occurrence count of each element, means for modifying the nil occurrence counts to make them non-nil, and means for calculating the rate associated with an element as a function of its occurrence count.

The encoding device comprises means adapted to implement the above features.

The encoding device has advantages similar to those already presented.

The invention also relates to a digital apparatus including the device according to the invention, or means for implementing the method according to the invention. This digital apparatus is for example a digital camera, a digital camcorder, a scanner, a printer, a photocopier, or a fax machine. The advantages of the device and of the digital apparatus are identical to those already set out.

The invention also concerns an information storage means, which can be read by a computer or microprocessor, integrated or not into the device, and possibly removable, storing a program implementing the method according to the invention.

The invention also concerns a computer program readable by a microprocessor, comprising one or more sequences of instructions and capable of implementing the methods according to the invention.

BRIEF DESCRIPTION OF THE DRAWINGS

The features and advantages of the present invention will appear more clearly from a reading of a preferred embodiment illustrated by the accompanying drawings, in which.

DETAILED DESCRIPTION OF THE PREFERRED EMBODIMENTS

Figure 1:
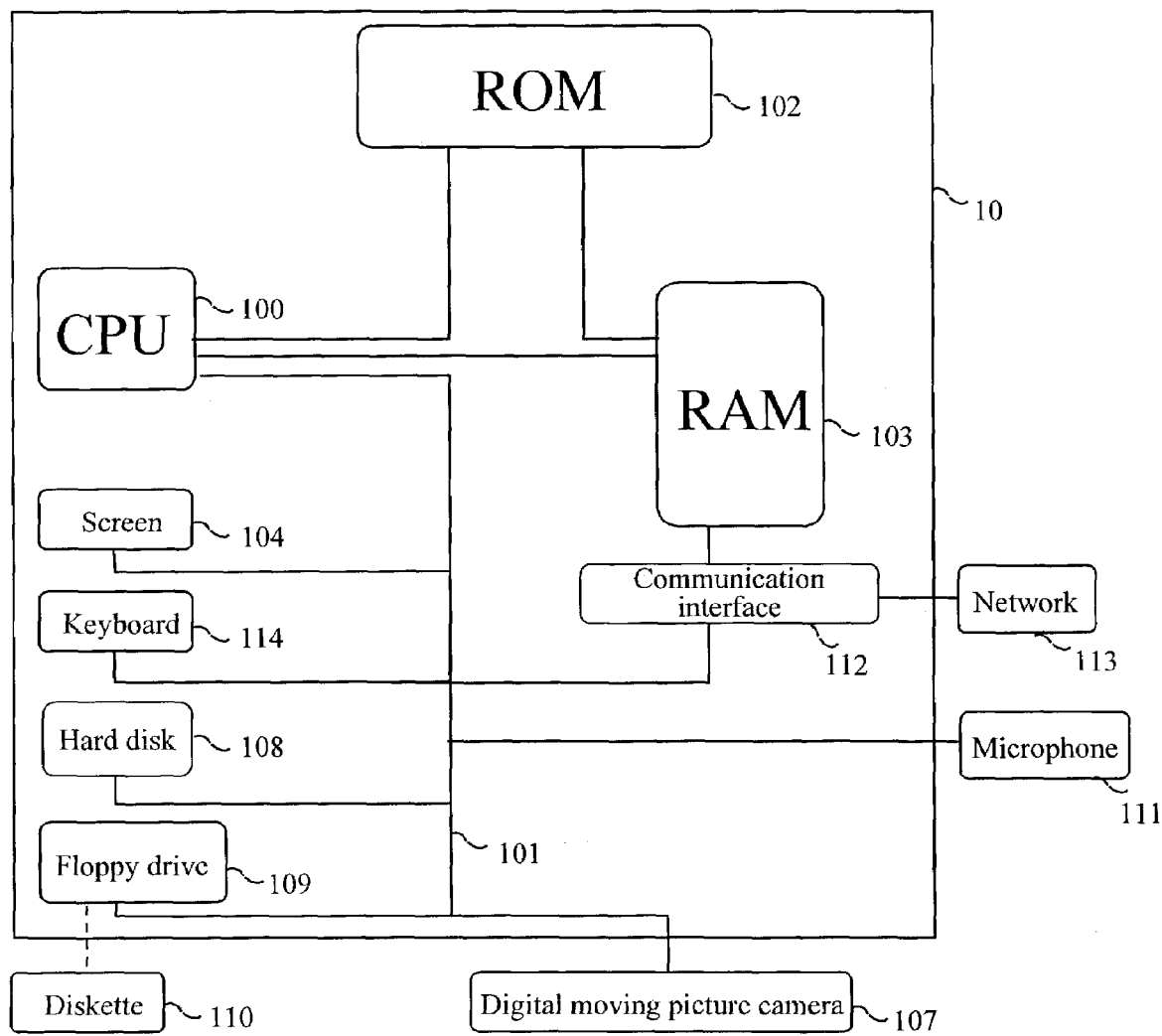
FIG. 1 is an embodiment of a device implementing the invention.

According to the chosen embodiment shown in FIG. 1, a device implementing the invention is for example a microcomputer 10 connected to different peripherals, for example a digital moving picture camera 107 (or a scanner, or any means of acquiring or storing an image) connected to a graphics card and supplying information to be processed according to the invention.

The device 10 comprises a communication interface 112 connected to a network 113 able to transmit digital data to be processed or conversely to transmit data processed by the device. The device 10 also comprises a storage means 108 such as a hard disk. It also comprises a drive 109 for a disk 110. This disk 110 may be a diskette, a CD-ROM, or a DVD-ROM, for example. The disk 110, like the disk 108, can contain data processed according to the invention as well as the program or programs implementing the invention which, once read by the device 10, will be stored on the hard disk 108. According to a variant, the program enabling the device to implement the invention can be stored in a read-only memory 102 (referred to as ROM in the drawing). In a second variant, the program can be received in order to be stored in an identical fashion to that described previously via the communication network 113.

The device 10 is connected to a microphone 111. The data to be processed according to the invention will in this case consist of audio signal.

This same device has a screen 104 for displaying the data to be processed or serving as an interface with the user, who can thus parameterize certain processing modes, using the keyboard 114 or any other means (a mouse for example).

The central processing unit 100 (referred to as CPU in the drawing) executes the instructions relating to the implementation of the invention, which are stored in the read only memory 102 or in the other storage means. On powering up, the processing programs stored in a non-volatile memory, for example the ROM 102, are transferred into the random access memory RAM 103, which will then contain the executable code of the invention, as well as registers for storing the variables necessary for implementing the invention.

In more general terms, an information storage means, which can be read by a computer or microprocessor, integrated or not into the device, and which may possibly be removable, stores a program implementing the method according to the invention.

The communication bus 101 affords communication between the different elements included in the microcomputer 10 or connected to it. The representation of the bus 101 is not limiting and, in particular, the central processing unit 100 is able to communicate instructions to any component of the microcomputer 10 directly or by means of another element of the microcomputer 10.

Figure 2:
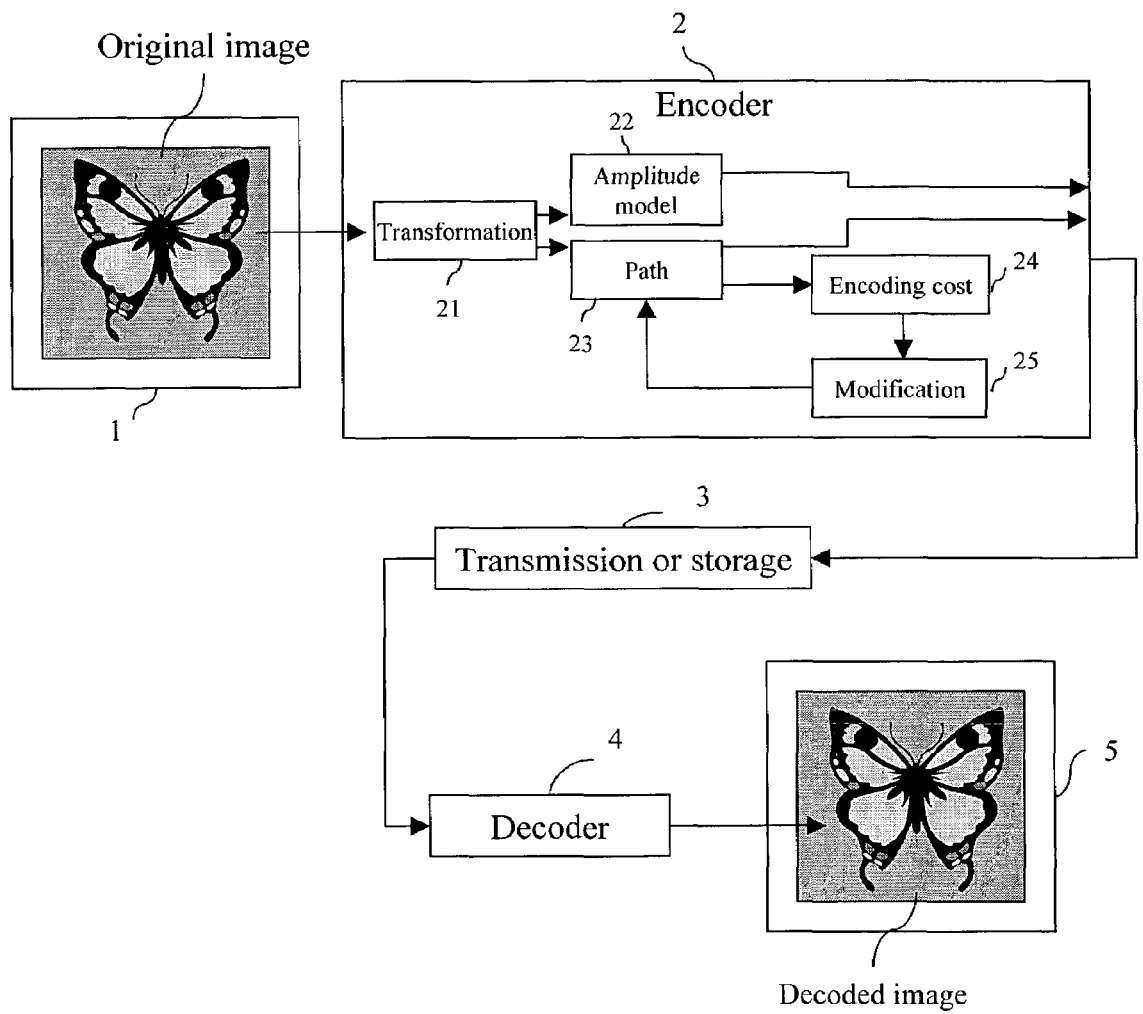
FIG. 2 shows an encoding device according to the invention and a corresponding decoding device.

With reference to FIG. 2, an embodiment of an encoding device 3 according to the invention is adapted to encode a digital signal with the object of compressing it. The encoding device is integrated into an apparatus, which is for example a digital camera, a digital camcorder, a scanner, a printer, a photocopier, a fax machine, a database management system, or a computer.

An image source 1 supplies a digital image to the encoding device 2, of which the operation will be detailed below. The encoding includes determining a path between the samples of the set.

According to the first aspect of the invention, the encoding device comprises:

means 21 for transforming data,
means 22 for calculating an amplitude model,
means 23 for determining a path between the transformed data.

According to the invention, the encoding device comprises:

means 24 for measuring an encoding cost which depends on the path,
means 25 for modifying the path,
the means for measuring and modifying being adapted to reiterate their operation so as to determine a path which minimizes the encoding cost.

According to the second aspect, the encoding device comprises:

means for determining vectors from samples of the set,
means for determining the occurrence count of each vector,
means for modifying the nil occurrence counts to make them non-nil,
means for calculating the rate associated with a vector as a function of its occurrence count.

The encoding device supplies a file containing data representing the compressed image, to transmission means and/or memory storage means 3. These means are conventional and are not described here.

The means 3 are connected to a decoding device 4.

It should be noted that the encoding device and decoding device may be incorporated into the same apparatus, for example the computer 10 of FIG. 1.

Figure 3:
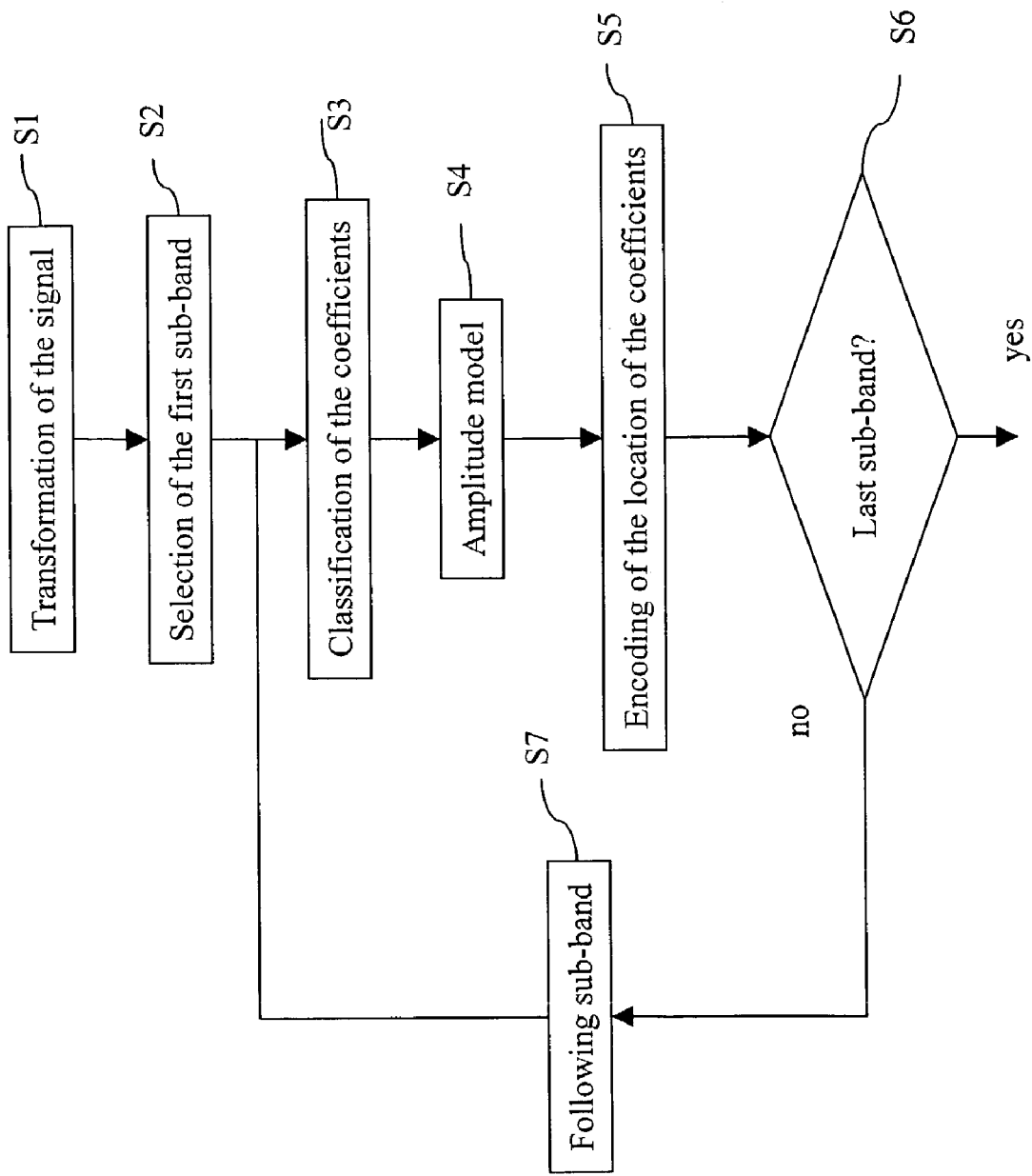
FIG. 3 is an embodiment of an encoding method according to the invention.

FIG. 3 shows an embodiment of a method of encoding an image, according to the invention. This method is implemented in the encoding device and comprises the steps S1 to S7.

The method generally comprises a transformation of the signal to be encoded, then the determination of an amplitude model of the coefficients output from the transformation. The locations of these coefficients are next encoded according to a method using a path established between the coefficients.

Such an encoding method is described for example in the French patent application No. 01 06933 filed by the present applicant.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

Step S1 is a linear or non-linear transformation of a digital image IM to be processed according to the invention. The size of the image is for example 512×512 pixels.

In the preferred embodiment of the invention, the transformation is a decomposition into frequency sub-bands.

The signal is decomposed into frequency sub-bands at several resolution levels by a DWT (Discrete Wavelet Transform) at M resolution levels.

A circuit for decomposition into frequency sub-bands, as well as an image processed by this circuit, will be described below with reference to FIGS. 5 to 7.

It should be noted that the low sub-band may be encoded according to the method described below or in conventional manner by linear prediction.

Other types of transformation may be used, for example DCT (Discrete Cosine Transformation) or Fourier transformation or else a non-linear transformation such as a morphological transformation.

The following step S2 is the selection of a first sub-band resulting from the preceding decomposition. The sub-bands are considered one by one.

The following step S3 is a classification of the coefficients of the current sub-band. The sign of the coefficients is first of all encoded independently. The coefficients are next considered in absolute value and are classified from greatest to least.

The following step S4 is the determination of an approximation function of the series of the classified coefficients. This function is for example a decreasing exponential defined by a set of parameters which are determined by regression.

Figure 8:
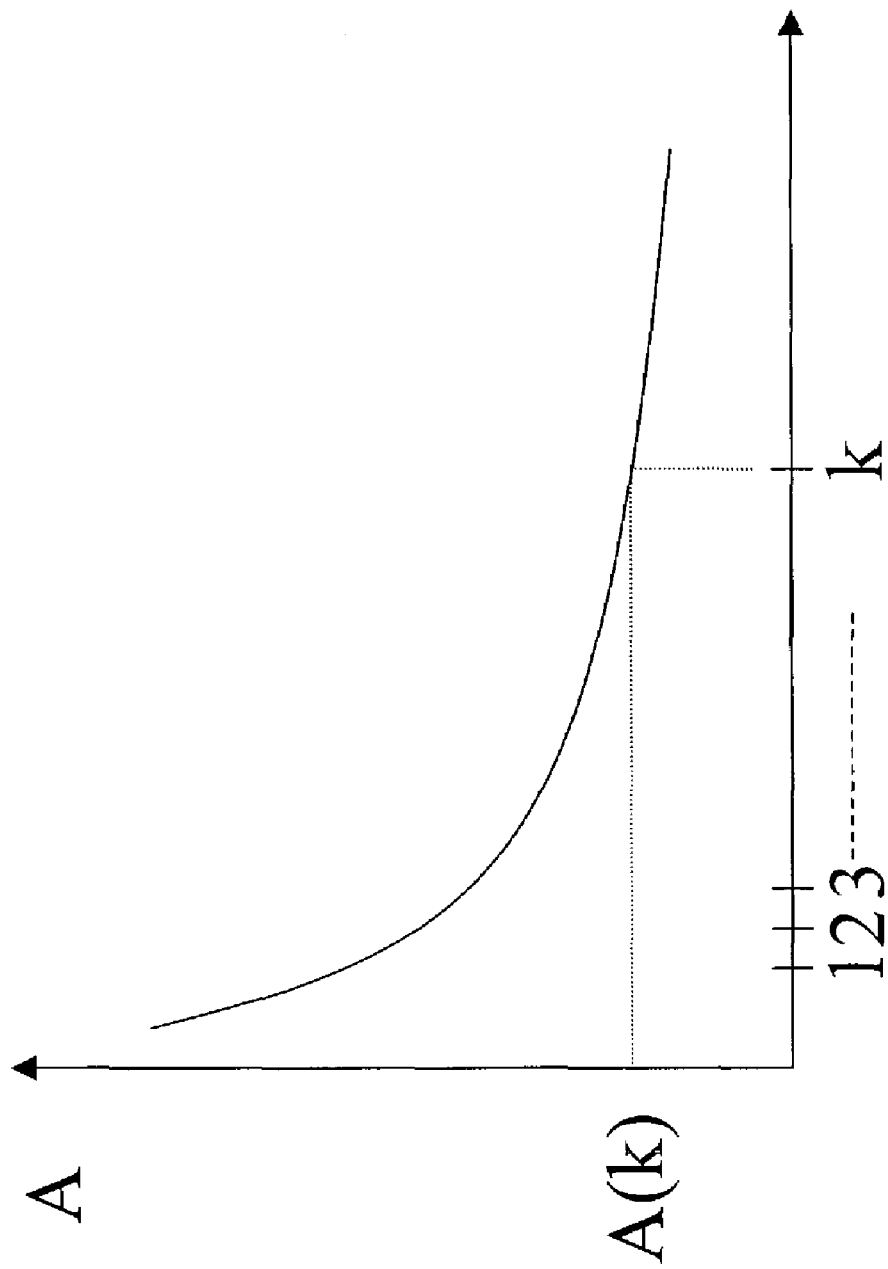
FIG. 8 shows an amplitude model used according to the present invention.

FIG. 8 shows an example of an amplitude model A. A value A(k) supplied by the amplitude model corresponds to each integer value k along the x-axis. The value A(k) is an approximation of the amplitude of the $k^{th}$ coefficient classified in decreasing order.

The following step S5 is the encoding of the locations of the coefficients. This step comprises determining a path between the coefficients of the current sub-band such that the encoding cost of this path is minimum. The path comprises an initial coefficient and the list of the vectors joining the other coefficients. Each coefficient of the path different from the initial coefficient is represented by a vector describing its location with respect to the preceding coefficient in the path. It should be noted that the path does not necessarily include all the coefficients of the current sub-band. This is because it is possible to encode only part of the coefficients and to set the other coefficients to the value zero at the time of later decoding.

Once the path has been determined, the coordinates of the initial coefficient are encoded by binary encoding and the vectors are encoded by entropic encoding.

Step S5 will be detailed below.

The encoded form of a sub-band of the image comprises an amplitude model which supplies an approximation of the amplitude of the coefficients and a path which supplies an ordered series of the locations of the coefficients. The location of the $k^{th}$ coefficient of this series is determined by the path and its amplitude is determined by the y-coordinate corresponding to the x-coordinate k according to the amplitude model.

the following step S6 is a test to determine if the current sub-band is the last sub-band of the image to be encoded.

If the response is negative, this step is followed by the step S7 at which a following sub-band is considered. Step S7 is followed by the previously described step S3.

If the response is positive at step S6, then the encoding of the image is terminated.

Figure 4:
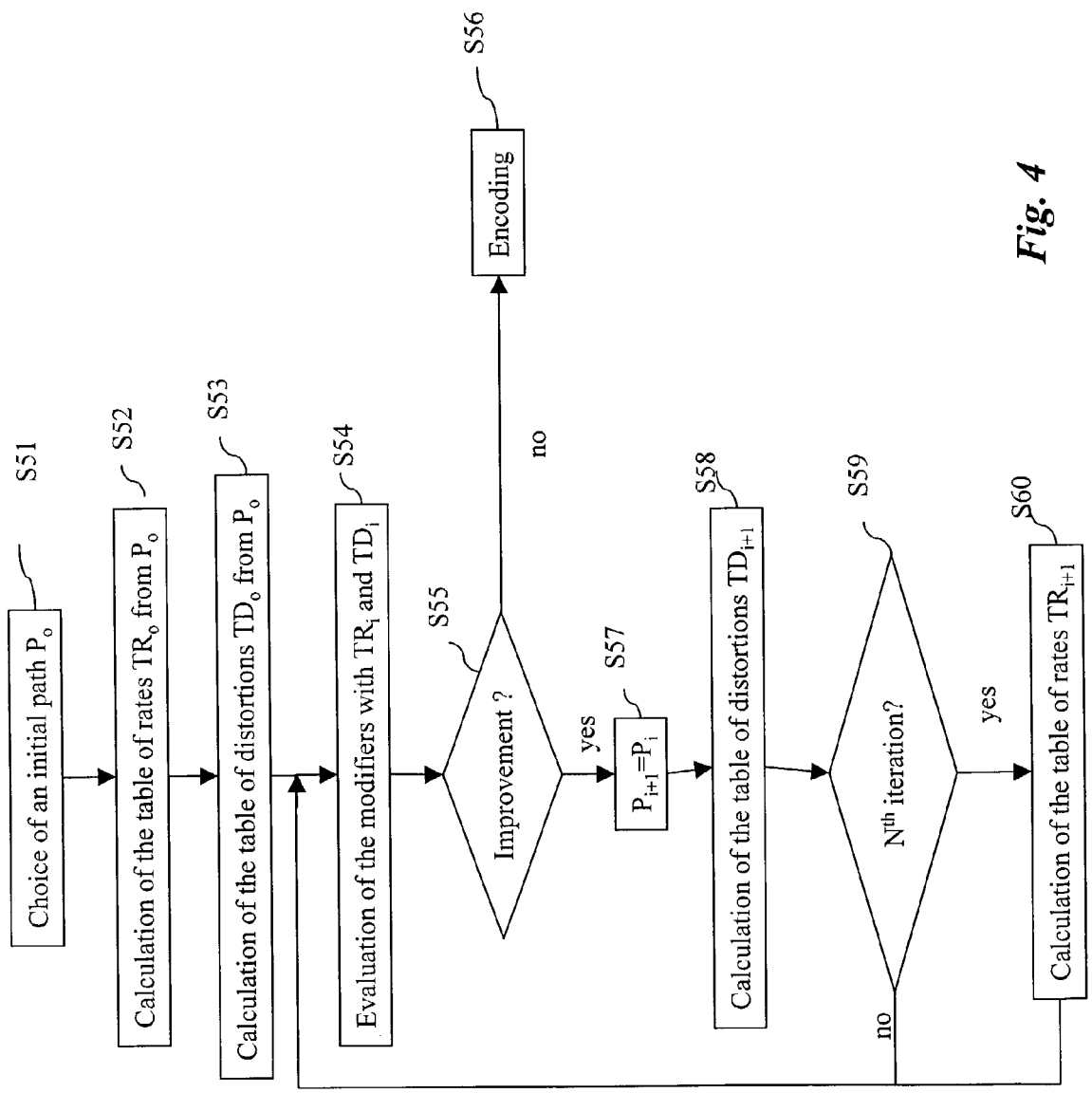
FIG. 4 is an embodiment of location encoding method, included in the method of FIG. 3.

FIG. 4 shows an embodiment of the step S5 of encoding of the locations of the coefficients. This encoding comprises the steps S51 to S60.

This encoding generally comprises the determination of a path between the coefficients and the encoding of the coefficients according to the path. A path comprises a coefficient of the sub-band, known as the initial coefficient, and a list of vectors joining at least some of the other coefficients.

The path is determined iteratively, so as to minimize an encoding cost. The encoding cost represents a compromise between rate and distortion. The cost of encoding a signal S is here the function $C(S)=R(S)+\lambda.D(S)$, in which R(S) represents the rate of transmission of the encoded form of the signal S, D(S) represents the distortion generated in the signal reconstructed after encoding and decoding, with respect to the original signal, and $\lambda$ is a parameter of adjustment between compression and distortion.

It should be noted that the minimization of the function C(S) on the signal S is equivalent to the minimization of the function C(S) on each element of a partition of the signal, in particular on each sample of the signal. This is due to the fact that the distortion and the rate are respectively additive.

Step S51 is the determination of an initial path $P_0$ in the current frequency sub-band.

The initial path may be determined at random. It may also be chosen while minimizing only the distortion D. In this case, the order of the coefficients is that of the amplitude model, that is to say from greatest to least.

It is still possible to choose the first M coefficients in the order of the amplitude model, with M being an integer less than the number of coefficients of the current sub-band, so as to limit the rate.

The following step S52 is the calculation of the table $TR_0$ comprising the rate of encoding of each coefficient when the path is the initial path $P_0$.

For this, it is necessary to calculate the rate of three types of coefficient.

First of all, the rate of encoding of the initial coefficient is equal to the number of bits used to encode its location.

The rate of encoding of the coefficients which do not belong to the path is nil.

The rate of encoding of the other coefficients, i.e. the coefficients belonging to the path and different from the initial coefficient, is calculated in the following manner.

It should be recalled that each coefficient of the path is represented by a vector describing it location with respect to the preceding coefficient in the path.

The histogram H of all the possible vectors in the sub-band is calculated. The histogram is a table comprising the count of occurrences of each vector in the path. The vectors which belong to the path have a non-nil occurrence count, whereas the other vectors have a nil occurrence count.

The histogram is next modified such that the vectors which have a nil occurrence count receive a modified non-nil occurrence count.

This is because the rate associated with each vector V is calculated from the histogram, according to the following formula:

$$R(V)=-\log_2(occ(V)/occt)$$

Where occt is the total occurrences count in the histogram and occ(V) is the occurrence count of the vector V.

If the vector V has a nil occurrence count, its rate, and consequently its encoding cost will be infinite. As will be set out below, the object of the later iterations is to modify the path by selecting the vectors having the lowest encoding cost. The vector V having an infinite cost can never be selected.

In order not to eliminate such vectors a priori, the nil occurrence counts of the histogram are replaced by non-nil values. These modified values remain low, however, with respect to the other values of the histogram, in such a manner as to reflect the fact that these vectors have still not been used in the path.

The modification of the histogram H is as follows:

$$H1=H+b$$

Where b is a non-nil number, chosen such that the cost of the vectors not yet used will not be too high in order to have some chance of being used in the path. For example, it may be chosen to have b=0.02.

The following step S53 is the calculation of the table $TD_0$ comprising the distortion generated by the encoding of each coefficient when the path is the initial path $P_0$.

For this, it is necessary to calculate the distortion of two types of coefficient.

First of all, for a coefficient belonging to the path and situated in $k^{th}$ position in it, the distortion is equal to the difference between the value of the coefficient and the value A(k) given by the amplitude model.

For a coefficient not belonging to the path $P_0$, the distortion is equal to the difference between the value of the coefficient and zero.

The following step S54 is an evaluation of modifiers of the current path $P_i$, where i is an integer.

For this, modifiers are applied to the path and for each of them the effect on the overall cost is measured.

The modifiers used are the following:

the last coefficient of the path is withdrawn. The rate of encoding of this coefficient becomes nil and its distortion becomes equal to the difference between the value of the coefficient and zero a coefficient not belonging to the path is added to its end. There are as many modifiers of this type as coefficients not belonging to the path. For each modifier, the rate of the coefficient added is read in the table of rates $TR_i$ and its distortion becomes equal to the difference between the value of the coefficient and the value given by the amplitude model.

two coefficients of the path are interchanged. There are as many modifiers of this type as there are pairs of coefficients in the path. For each modifier, the vectors beginning and finishing up at the two exchanged coefficients, i.e. four vectors, are modified. The rates associated with these four vectors are read in the table of rates $TR_i$. The distortions of the two exchanged coefficients become respectively equal to the difference between the value of the coefficient and the value given by the amplitude model.

The following step S55 is a test to determine whether one of the modifiers applied to the current path supplies a modified path having an encoding cost less than that of the current path.

If the response is negative, this means that the current path is the best in terms of the minimization of the encoding cost. Step S55 is then followed by the step S56 of encoding the locations of the coefficients.

If the response is positive at step S55, this means that one of the modified paths is better than the current path in terms of the minimization of the encoding cost. If several modified paths are better than the current path, then the one having the lowest encoding cost is considered. Step S55 is then followed by step S57 at which the path $P_{i+1}$ which has the lowest encoding cost becomes the current path.

At the following step S58, the table of distortions $TD_{i+1}$ is updated for the new current path. This updating is simple, since, as set out above, the modification has involved one or two coefficients. All that is required is to calculate the distortion of the coefficient or coefficients involved.

The following step S59 is a test on the number of iterations carried out. It is chosen to update the table of rates only every N iterations, where N is an integer determined as a function of the number of coefficients in the current sub-band. For example, the integer N is equal to approximately 5% of the number of coefficients in the current sub-band. Indeed, a change of coefficient of the path causes a change in the histogram of the vectors and consequently a change of all the rates of the vectors. The assumption is made that the modifier applied has only a small influence on the rates.

Where N iterations have not been carried out since the previous update of the table of rates, step S59 is followed by step S54 already described. The path which is then considered has only had the distortion table updated.

Every N iterations, the table of rates $TR_{i+1}$ is updated. To do this, step S59 is then followed by the step S60. At this step, all the rates corresponding to the modified histogram are calculated. The calculation is similar to that of step S52, with the current path. The calculation includes the calculation of a histogram and its modification, as already set out.

As a variant, it is possible to make the number b reduce progressively with the iterations, so as to be more and more selective. For example, it may be chosen to have:

$$b=0.001+0.0199.e^{-0.01i}$$

in order to have b=0.02 at the first iteration and to tend asymptotally towards b=0.001 during the following iterations.

Step S60 is followed by the previously described step S54.

Thus, the determination of the path having the lowest encoding cost is carried out by iteration of steps S54 to S60.

The decoding of the encoded image is carried out as set out in the French patent application No. 01 06933.

The amplitude model is read and decoded, in order to provide the amplitudes of the coefficients. The path is read and decoded in order to provide the locations of the coefficients. The order of each coefficient in the path determines it amplitude, since the $k^{th}$ coefficient receives the amplitude A(k) corresponding to the x-coordinate k.

The coefficients which do not form part of the path are set to zero.

Figure 5:
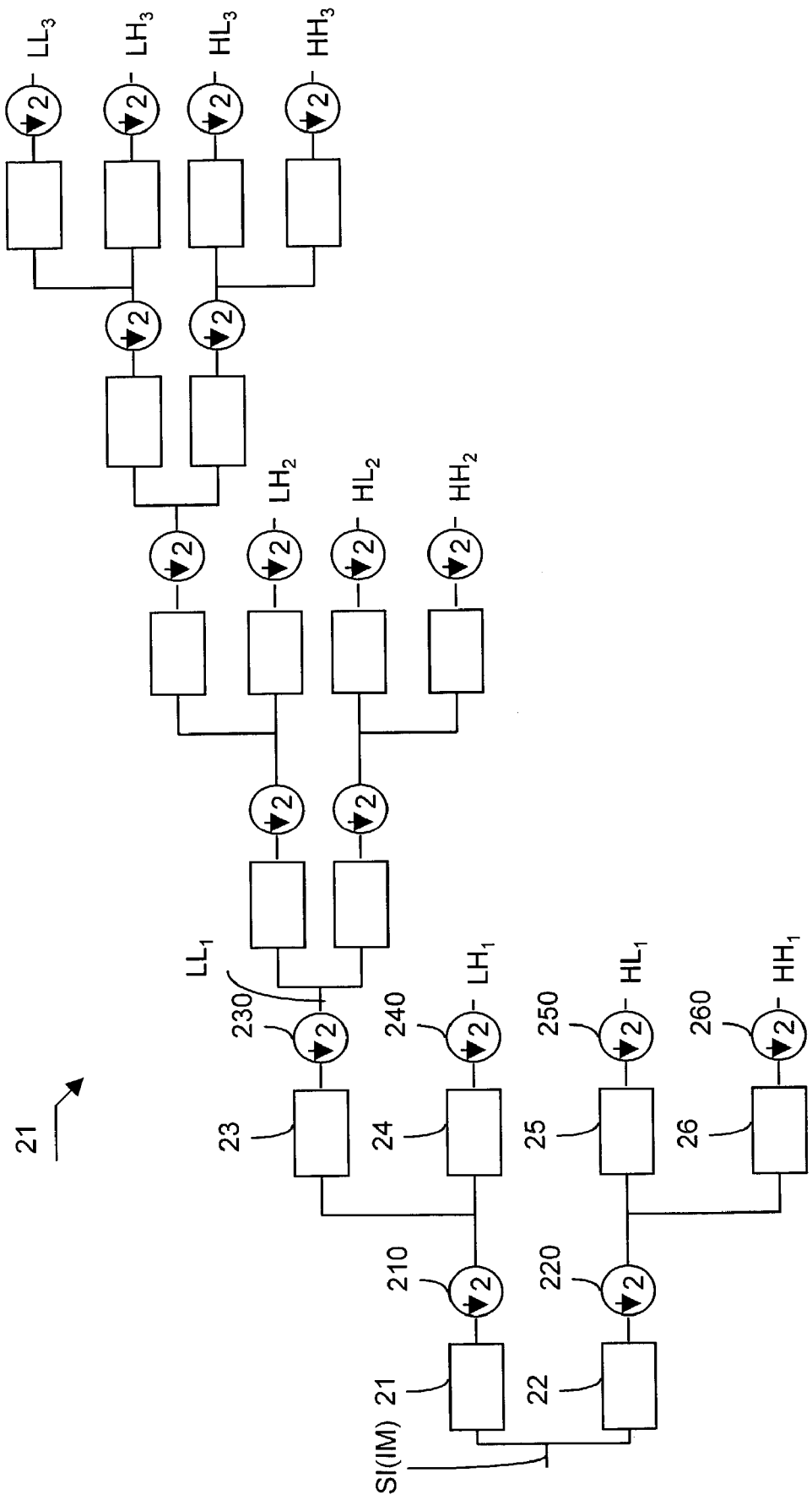
FIG. 5 shows a circuit for decomposition into frequency sub-bands included in the encoding device according to the invention.

According to FIG. 5, the circuit 21 comprises three successive analysis units for decomposing the image IM into sub-bands at three resolution levels.

Generally, the resolution of a signal is the number of samples per unit length used for representing that signal. In the case of an image signal, the resolution of a sub-band is related to the number of samples per unit length used for representing that sub-band. The resolution depends in particular on the number of decimations carried out.

The first analysis unit receives the digital image signal and applies it to two digital filters 210 and 220 which are respectively low-pass and high-pass which filter the image signal in a first direction, for example horizontal in the case of an image signal. After passing through decimators by two 2100 and 2200, the resulting filtered signals are respectively applied to two low-pass filters 230 and 250, and high-pass filters 240 and 260, which filter them in a second direction, for example vertical in the case of an image signal. Each resulting filtered signal passes through a respective decimator by two 2300, 2400, 2500 and 2600. The first unit outputs four sub-bands $LL_1$, $LH_1$, $HL_1$ and $HH_1$ of the highest resolution $RES_1$ in the decomposition.

The sub-band $LL_1$ comprises the components, or coefficients, of low frequency, in both directions, of the image signal. The sub-band $LH_1$ comprises the components of low frequency in a first direction and of high frequency in a second direction, of the image signal. The sub-band $HL_1$ comprises the components of high frequency in the first direction and the components of low frequency in the second direction. Finally, the sub-band $HH_1$ comprises the components of high frequency in both directions.

Each sub-band is an image constructed from the original image, which contains information corresponding to a respectively vertical, horizontal and diagonal orientation of the image, in a given frequency band.

The sub-band $LL_1$ is analyzed by an analysis unit similar to the previous one in order to supply four sub-band signals $LL_2$, $LH_2$, $HL_2$ and $HH_2$ of intermediate resolution level $RES_2$ in the decomposition. The sub-band $LL_2$ comprises the low frequency components in the two directions of analysis, and is analyzed in its turn by the third analysis unit which is similar to the two previous ones. The third analysis unit supplies the sub-bands $LL_3$, $LH_3$, $HL_3$ and $HH_3$, of the lowest resolution level $RES_3$ in the decomposition, resulting from the division into sub-bands of the sub-band $LL_2$.

Each of the sub-bands of resolution $RES_2$ and $RES_3$ also corresponds to an orientation in the image.

The decomposition carried out by the circuit 21 is such that a sub-band of given resolution is divided into four sub-bands of lower resolution and thus has four times more coefficients than each of the sub-bands of lower resolution.

Figure 7:
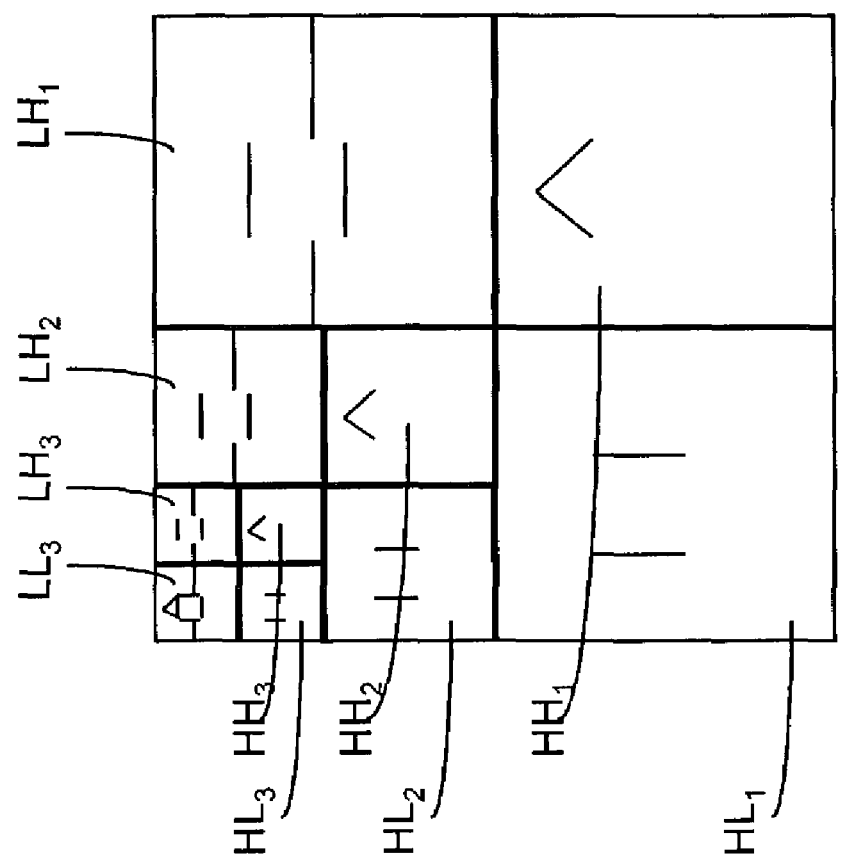
FIG. 7 is a digital image decomposed into sub-bands according to the present invention.
Figure 6:
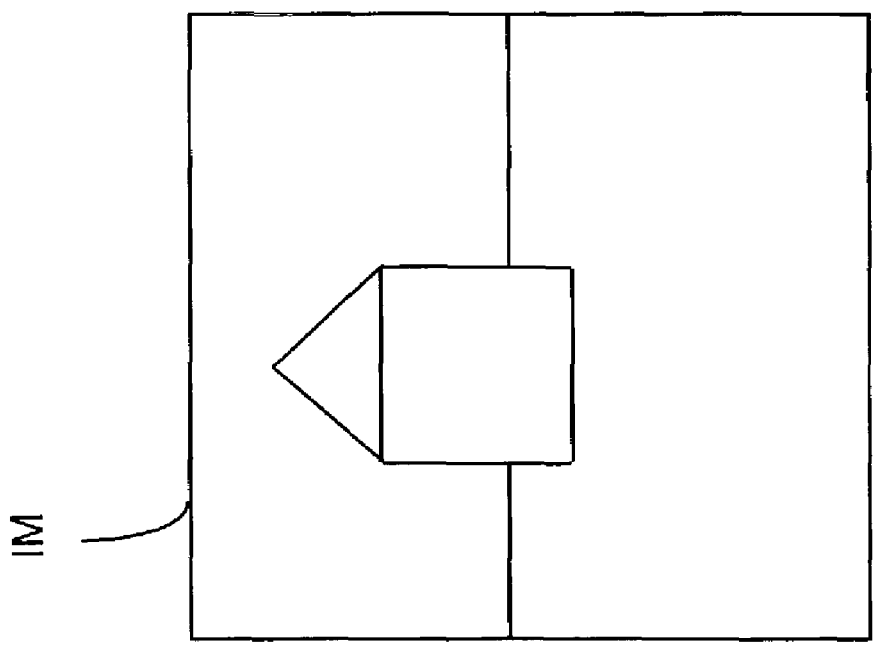
FIG. 6 is a digital image to be encoded according to the present invention.

A digital image IM output from the image source 1 is represented diagrammatically in FIG. 6, whereas FIG. 7 represents the image IMD resulting from the decomposition of the image IM, into ten sub-bands at three resolution levels, by the circuit 21. The image IMD comprises as much information as the original image IM, but the information is divided in frequency at three resolution levels.

The lowest resolution level $RES_3$ comprises the sub-bands $LL_3$, $HL_3$, $LH_3$ and $HH_3$, that is to say the sub-bands of low frequency in the two directions of analysis. The second resolution level $RES_2$ comprises the sub-bands $HL_2$, $LH_2$ and $HH_2$ and the highest resolution level $RES_1$ comprises the sub-bands $HL_1$, $LH_1$ and $HH_1$ of highest frequency.

The sub-band $LL_3$ of lowest frequency is a reduction of the original image. The other sub-bands are detail sub-bands.

Naturally, the number of resolution levels, and consequently of sub-bands, can be chosen differently, for example 13 sub-bands and four resolution levels, for a bi-dimensional signal such as an image. The number of sub-bands per resolution level can also be different. The analysis and synthesis circuits are adapted to the dimension of the signal processed.

Figure 9:
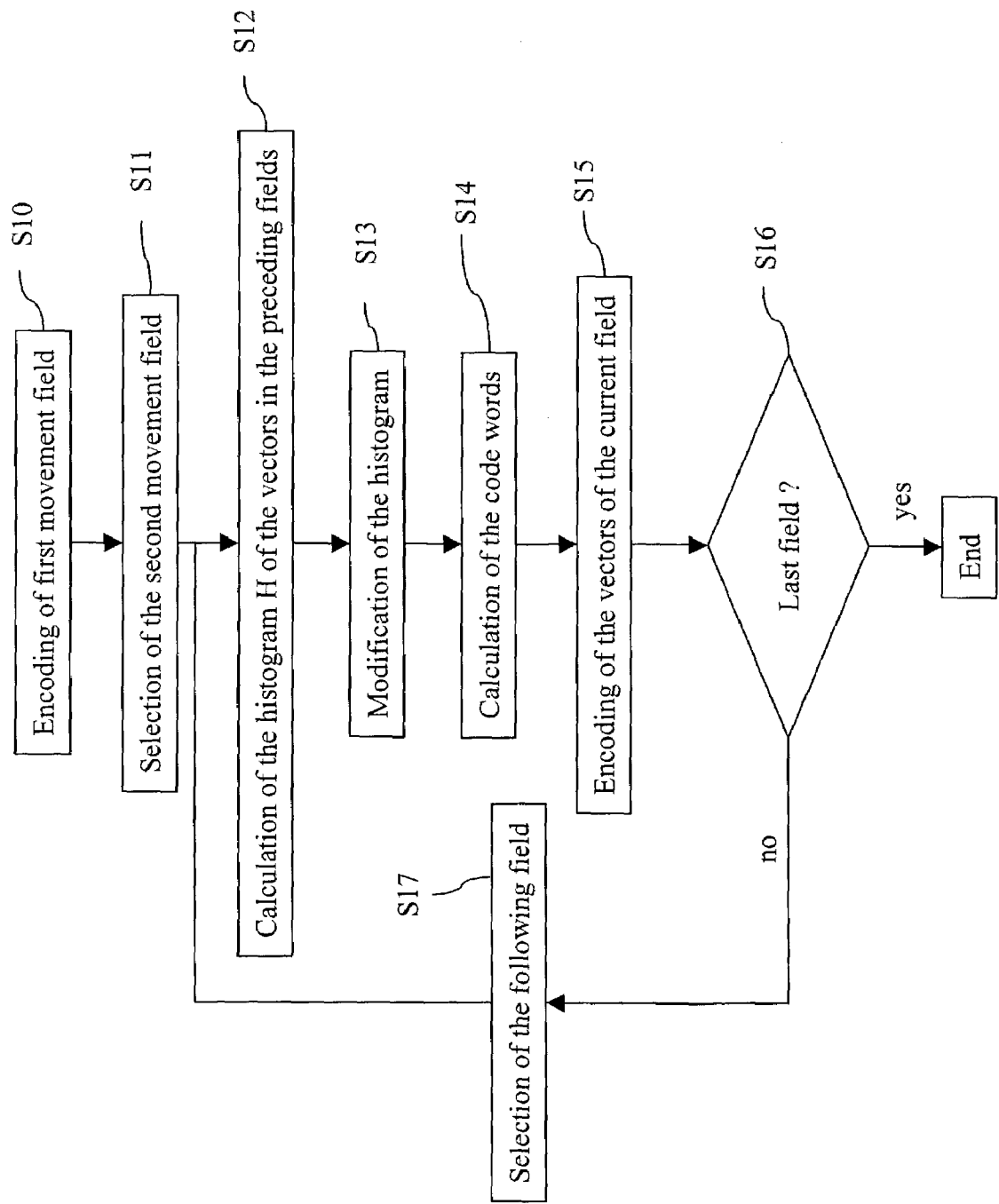
FIG. 9 shows a second embodiment of an encoding method according to the invention.

FIG. 9 shows a second method embodiment according to the second aspect of the invention. This method is implemented in the encoding device and comprises the steps S10 to S17.

The method here concerns image sequence encoding. In conventional manner, this type of encoding comprises the encoding of movement vectors respectively representing the displacement of blocks of pixels between two consecutive images of the sequence. For example, document U.S. Pat. No. 5,907,360 describes such a type of encoding.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

A field of movement vectors is associated with each image of the sequence, except for the first. Each vector field is encoded by an adaptive entropic encoding. According to the present invention, a histogram of movement vectors is modified, as set out below.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

Step S10 is an encoding of a first moment field. This movement field comprises for example the movement vectors associated with the second image of the sequence which are determined with respect to the first image of the sequence. The distribution of the vectors is unknown a priori. Consequently, the encoding used at this step is predetermined. A code of fixed length may for example be used.

The following step S11 is the selection of a second movement field which becomes the current movement field.

The following step S12 is the calculation of the histogram of the possible vectors in all the fields preceding the current field. The histogram is a table comprising the occurrence count of each vector in all the fields preceding the current field. The vectors which belong to one of the fields preceding the current field have a non-nil occurrence count, whereas the other vectors have a nil occurrence count.

The following step S13 is a modification of the histogram. This is because it is possible for the vectors of the current field to have a nil occurrence in the histogram. For this, as in the first embodiment, the value 0.02 is added to all the values of the histogram.

The following step S14 is the calculation of the code words enabling the current field to be encoded. The code words determine the rate necessary to represent the current field. This calculation uses the modified histogram and the formula $R(V) = -\log_2(\mathrm{occ}(V)/\mathrm{occt})$.

For example, a Huffman encoding is calculated according to the modified histogram. Those calculation conventionally comprises two steps, the construction of a Huffman tree and the construction of the code associated with each vector. Such a calculation is detailed in the work of A. GERSHO and R. M. GRAY entitled "Vector quantization and signal compression", chapter 9 section 4, Ed. Kluer, 1992.

The following step S15 is the encoding of the current field of vectors with the code words determined earlier.

The following step S16 is a test to determine if the current field is the last of the sequence. If the response is negative, then this step is followed by the step S17 at which a following field is selected. Step S17 is followed by the step S12 already described.

When the response is positive at step S16, the encoding of the image is terminated.

Of course, the present invention is in no way limited to the embodiments described and represented, but encompasses, on the contrary, any variant form within the capability of the person skilled in the art.

The invention applies to any encoding mode including the calculation of a path between samples to be encoded. In particular, it applies to the method of encoding described in the French patent application No. 01 03922.

The invention claimed is:

1. A method of encoding digital samples of a set of data representing physical quantities, the method comprising the steps of:
determining a path among the samples of the set;
measuring an encoding cost which depends on the path;
modifying the path; and
reiterating said steps of measuring and modifying so as to determine a path which minimizes the encoding cost,
in which said measuring step includes calculating a rate used to encode each sample according to the path, and
in which updating of the rate is carried out every N iterations, with N being an integer greater than or equal to two.

2. A method of encoding digital samples of a set of data representing physical quantities, the method comprising the steps of:
determining a path among the samples of the set;
measuring an encoding cost which depends on the path;
modifying the path; and
reiterating said steps of measuring and modifying so as to determine a path which minimizes the encoding cost,
in which said measuring step includes calculating a rate used to encode each sample according to the path, and
in which calculating the rate includes calculating an occurrence count of a vector describing a location of each sample with respect to a preceding sample in the path.

3. A method according to claim 1 or 2, in which said measuring step includes calculating a distortion generated by encoding of each sample according to the path.

4. An apparatus for processing a digital image, comprising a microprocessor programmed to implement the method according to claim 3.

5. A computer-readable medium storing a computer program for implementing the method according to claim 3.

6. A method according to claim 1 or 2, in which said modifying step includes withdrawing a last sample from the path.

7. A method according to claim 1 or 2, in which said modifying step includes adding a sample not belonging to the path to an end of the path.

8. A method according to claim 1 or 2, in which said modifying step includes swapping places of two samples of the path.

9. A method according to claim 1 or 2, in which calculating the distortion includes calculating a difference between a value of each sample and its respective decoding value.

10. An apparatus for processing a digital image, comprising a microprocessor programmed to implement the method according to claim 9.

11. A computer-readable medium storing a computer program for implementing the method according to claim 9.

12. A computer program stored on a computer-readable medium storing a program comprising executable instructions for causing a computer to encode digital samples of a set of data according to claim 1 or 2.

13. A device for encoding digital samples of a set of data representing physical quantities, said device comprising:
means for determining a path among the samples of the set;
means for measuring an encoding cost which depends on the path;
means for modifying the path; and
means for reiterating operation of the means for measuring and the means for modifying so as to determine a path which minimizes the encoding cost,
wherein said means for measuring the encoding cost comprises means for calculating a rate used to encode each sample according to the path, and
said device being adapted to update the rate every N iterations, with N being an integer greater than or equal to two.

14. A device for encoding digital samples of a set of data representing physical quantities, said device comprising:
- means for determining a path among the samples of the set;
- means for measuring an encoding cost which depends on the path;
- means for modifying the path; and
- means for reiterating operation of the means for measuring and the means for modifying so as to determine a path which minimizes the encoding cost,
- wherein said means for measuring the encoding cost comprises means for calculating a rate used to encode each sample according to the path, and
- wherein said means for calculating the rate are adapted to calculate an occurrence count of a vector describing a location of each sample with respect to a preceding sample in the path.

15. A device according to claim 13 or 14, wherein said means for measuring the encoding cost comprises means for calculating a distortion generated by the encoding of each sample according to the path.

16. A device according to claim 13 or 14, wherein said modifying means are adapted to withdraw a last sample of the path.

17. A device according to claim 13 or 14, wherein said modifying means are adapted to add a sample not belonging to the path to an end of the path.

18. A device according to claim 13 or 14, wherein said modifying means are adapted to make two samples of the path swap places.

19. A device according to claim 13 or 14, wherein said means for calculating the distortion are adapted to calculate a difference between a value of each sample and its respective decoding value.

20. An encoding device according to claim 13 or 14, wherein said means for measuring and modifying are incorporated in:
- a microprocessor,
- a read-only memory, comprising a program for processing the data, and
- a random access memory comprising registers adapted to record variables modified during the execution of said program.

21. An apparatus for processing a digital image, comprising the device according to claim 13 or 14.

* * * * *